United States Patent [19]

Chitayat et al.

[11] 4,013,280
[45] Mar. 22, 1977

[54] WORKPIECE POSITIONING TABLE

[76] Inventors: Anwar Chitayat, 8 Gilbert Lane, Plainview, N.Y. 11803; Stanley J. Squires, 27 Marbourne Road, Bethpage, N.Y. 11714

[22] Filed: Aug. 9, 1976

[21] Appl. No.: 712,596

[52] U.S. Cl. .................................. 269/60; 33/1 M; 33/174 TA; 269/71
[51] Int. Cl.² .......................................... B23Q 3/02
[58] Field of Search ...................... 269/60, 71, 73; 33/174 TA, 1 M; 51/240 R; 108/20, 137, 143

[56] References Cited

UNITED STATES PATENTS

| | | | |
|---|---|---|---|
| 3,638,933 | 2/1972 | Burnette et al. ...................... | 269/60 |
| 3,801,090 | 4/1974 | Gillen .................................. | 269/60 |

Primary Examiner—Al Lawrence Smith
Assistant Examiner—Robert C. Watson
Attorney, Agent, or Firm—Joel Halpern

[57] ABSTRACT

A workpiece positioning table includes a generally channel-shaped base member having a bottom web element and a pair of laterally spaced side wall elements projecting upwardly therefrom. At least one of the side wall elements is pre-tensioned so as to possess a spring force tending to deflect such side wall element inwardly towards the other of the side wall elements. A V-shaped notch is formed in the inner face of each side wall at a location above the bottom web element and in vertical alignment with each other. Each such notch extends lengthwise of the side wall, desirably to be coextensive therewith, and is heat-treated to a hardness greater than that of the adjacent surfaces of the side wall. The positioning table includes a carriage member carried by the base for reciprocatory movement between the side walls thereof. A V-shaped notch is formed in each of the opposed outer edges of the carriage side walls, such notches extending lengthwise of the carriage member and being located in vertically aligned relation with each other. The V-notches in the carriage are also heat-treated to a hardness greater than that of the adjacent surfaces of the carriage side walls. Sets of cross-mounted roller elements are positioned within the aligned and corresponding notches of the carriage and base members so as to rollably mount the carriage on the side walls of the base member. Driving means are provided for reciprocably moving the carriage, and a mechanism is provided for determining the extent of linear movement of the carriage. The pre-tensioned side wall construction of the base member thus serves to maintain alignment of the carriage within the ways which comprise the cooperating notches of the carriage and base members.

8 Claims, 4 Drawing Figures

WORKPIECE POSITIONING TABLE

BACKGROUND OF THE INVENTION

The present invention relates to workpiece positioning tables. Positioning tables for workpieces have been known heretofore whereby the workpiece is mounted upon a movable carriage and is directed thereon along a predetermined path selected to advance the workpiece past a series of stations at which selected machining or material forming operations are performed on the workpiece. One such positioning table has been marketed by Anorad Corporation of Smithtown, N.Y. Positioning tables of this character include a base member adapted to reciprocably carry a carriage between a pair of side walls projecting upwardly from the base. It has been conventional to form pairs of corresponding V-notches on inserts which are secured to the carriage and base members to thereby form the ways of the table. Ball or roller bearings are positioned within the corresponding sets of V-notches so as to rollably mount the carriage on the base.

The operations to be performed upon the workpiece generally require that the carriage be accurately aligned both vertically and laterally relative to the base and that such alignment be maintained over a substantial period of the operational longevity of the table. This has not been possible to the extent desired in prior art tables principally because of the need to utilize inserts requiring affixing to the carriage and base members by means such as screws or the like. Although the wear surfaces of the notches have performed satisfactorily the inserts in which the V-notches were formed usually became loose and resulted in misalignment of the corresponding matched notches of the carriage and bed with consequent misalignment of the carriage in the ways. Such misalignment of the carriage led to the production of imperfect workpieces and in excessive wear of the ball or roller elements thereby compounding the problem.

It has also been determined that consequent to the normal operation of the positioning table some degree of lateral "play" of the carriage in the ways developed. Vibratory stresses were induced in the table making it impossible to accurately machine or otherwise form the workpiece. Further, the use of the separate inserts involves the use of materials having different coefficients of heat and leads to distortions and inaccuracies attendant to temperature gradients created in the table during its operation. Loosening of the inserts is aggravated under such thermal conditions.

SUMMARY OF THE INVENTION

In view of the foregoing disadvantages inherent in prior art positioning tables it is one object of the invention to provide a workpiece positioning table in which the ways are integral with the machine and, therefore, are not susceptible to becoming loose and causing misalignment of the carriage.

It is another object of the invention to provide a workpiece positioning table in which the carriage and bed cooperate to maintain alignment and thereby minimize lateral play of the carriage within the ways.

It is yet another object of the invention to provide a workpiece positioning table in which variations in manufacturing tolerances in the ways are compensated for by roller selection and predetermined flexure of the base member.

It is still another object of the invention to provide a workpiece positioning table in which the ways are so integrated in the carriage and base members of the table as to preclude periodic replacement thereof.

Other objects and advantages of the invention will become readily apparent to persons skilled in the art from the following description of the invention.

In accordance with this invention there is provided a workpiece positioning table comprising the combination of a generally channel-shaped base member having a bottom web element and a pair of laterally spaced side wall elements projecting upwardly therefrom, at least one of such side wall elements being pretensioned under the influence of a predetermined load to thereby develop a spring force tending to deflect such side wall element inwardly towards the other of the side wall elements, a V-shaped notch formed in the inner face of each of such side wall elements at a vertically aligned location above the web element, each of the notches extending lengthwise of the side wall element, an elongated carriage member carried by the side wall elements of the base member for reciprocatory movement therebetween, the carriage member having a pair of opposed outer edges juxtapositioned adjacent the side walls of the base member, a V-shaped notch formed in each of such outer edges at vertically aligned locations and extending lengthwise of the carriage member, sets of cross-mounted roller elements positioned within the aligned notches of the carriage and base members so as to rollably mount the carriage on the base member, drive means for reciprocably moving the carriage on the base member, and a mechanism for determining the extent of linear movement of the carriage member.

BRIEF DESCRIPTION OF THE DRAWINGS

In order that the invention may be more fully comprehended it will now be described, by way of example, with reference to the accompanying drawings in which.

DETAILED DESCRIPTION OF THE INVENTION

Figure 1:
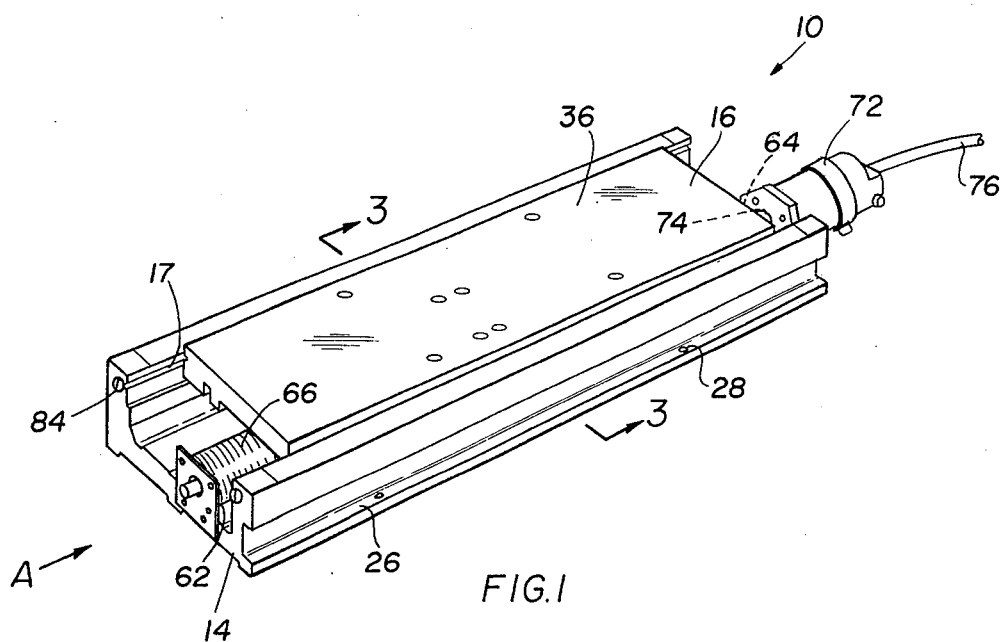
FIG. 1 is a perspective view of a workpiece positioning table embodying the features of the invention.
Figure 2:
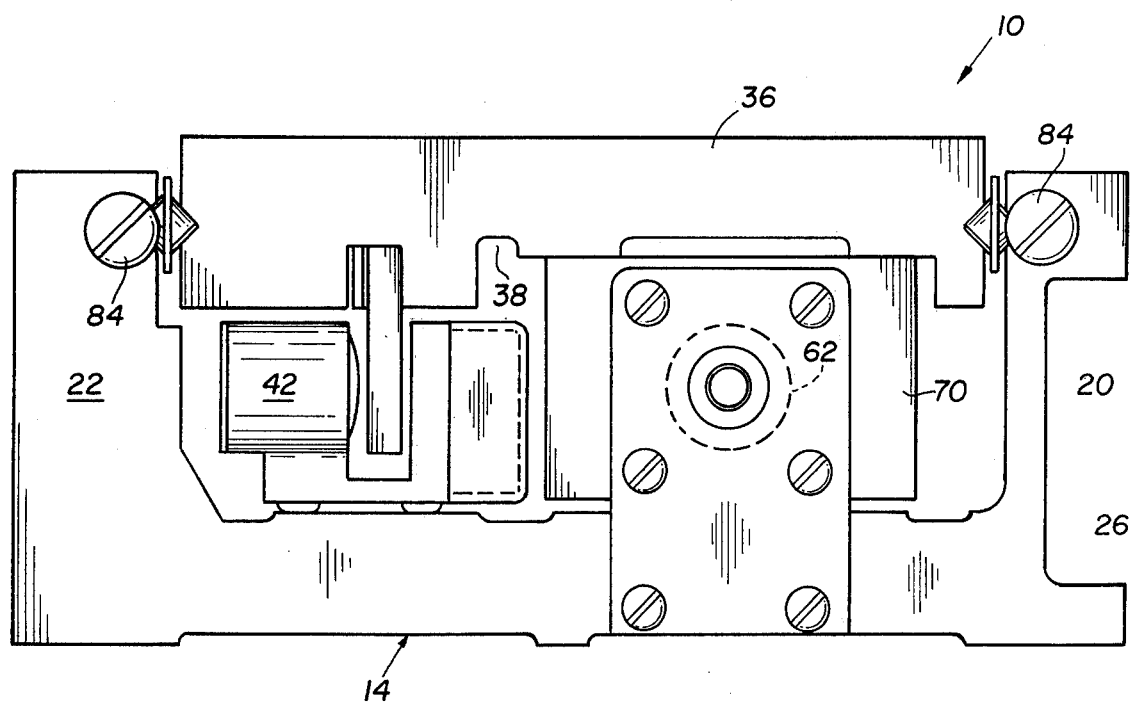
FIG. 2 is an end elevational view of the positioning table shown in FIG. 1 viewing the table in the direction of the arrow A.
Figure 3:
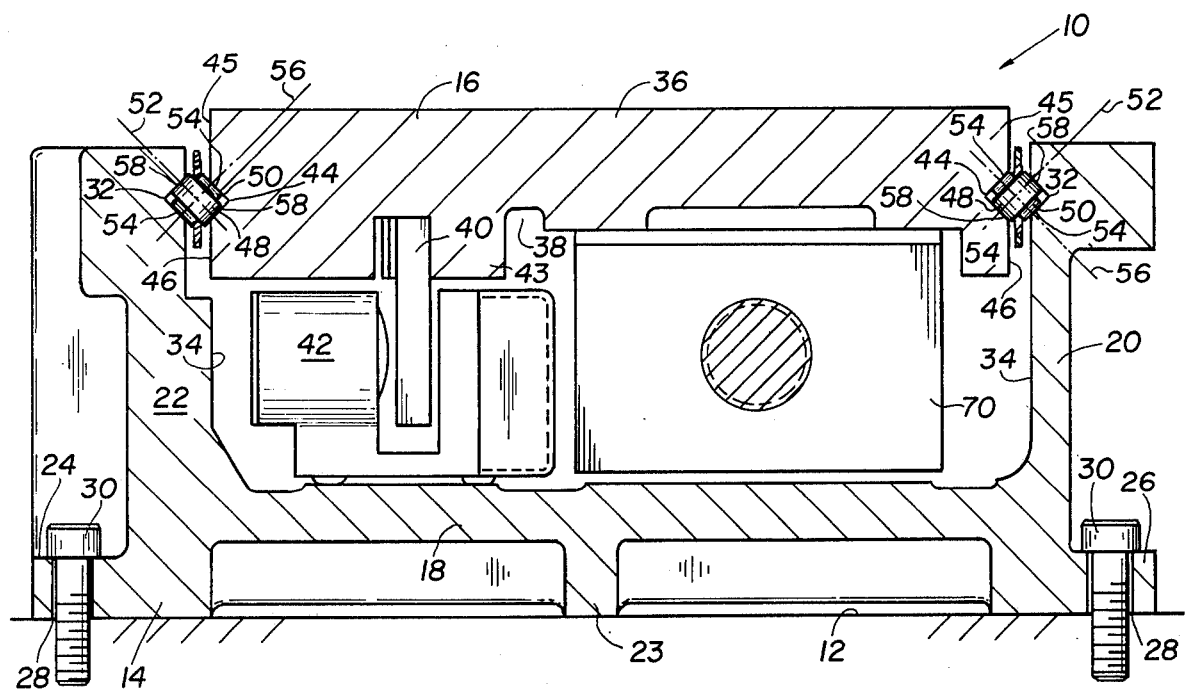
FIG. 3 is a cross-sectional view of the positioning table shown in FIG. 1 taken along line 3—3 thereof.

Referring to the drawings there is shown a workpiece positioning table indicated generally by reference numeral 10. The table is mounted upon a working surface 12. Although not shown it will be understood that a workpiece may be secured to the table in the conventional manner such as by pinning or by being supported upon a workplate.

The positioning table comprises a generally channel-shaped base member 14 and a carriage 16 which is so carried by the base member as to be reciprocable along the longitudinal axis thereof in the ways 17 formed by V-notches 32, 44 to be described. The base includes a bottom web element 18 and a pair of laterally spaced side walls 20, 22 projecting upwardly therefrom. The base is preferably formed with at least one rib 23 which is integral with and extends longitudinally of the web element. It is also desirable that the base be provided with outwardly extending flanges 24, 26 having apertures 28 therein by means of which the table can be fixedly mounted upon working surface 12. Customarily the base is pinned to the working surface by pin members 30 which are secured within corresponding apertures formed in the working surface.

At least one of the side walls of the base is pre-tensioned under the influence of a predetermined load to provide a spring force which tends to flex the side wall inwardly towards the other side wall. In the presently preferred embodiment side wall 20 is so pre-tensioned. Such side wall is pre-loaded in an amount of approximately 100 pounds per 12 inches of linear wall section. The purpose of the pre-loading will become clear as the description of the invention ensues. It will be understood that side walls 20 and 22 are substantially parallel in disposition, although it is contemplated that due to the pre-loading of one or both of the side walls some slight deviation from true parallelism may result and in fact may be desirable. Of at least equal importance, however, is the maintenance of true alignment between V-notches 32 and 44 formed in the side walls of the bed and carriage respectively as will presently be described.

The inner face 34 of each side wall of the base is given a V-shaped notch 32 at a location above the bottom web 18. Such notches are vertically aligned relative to the web and extend lengthwise of the side wall in which they are formed. Desirably the notches are coextensive in length with the length of the side wall.

The table includes a carriage member 36 which is elongated and generally slab-like in configuration. The lower surface of the carriage is provided with one or more recessed areas 38 dimensioned and configured to receive components 40, 42 therein for determining the linear movement of the carriage. The recessed areas may conveniently be defined by the depending projections 43 formed along the lower surface of the carriage similarly to the ribs on the base member. Such components may comprise an optical encoder scale 40 carried by the carriage and an optical encoder 42 mounted between the carriage and base member. A suitable linear encoder is the standard Anorad encoder Type EEI marketed by Anorad Corporation of Smithtown, N.Y. which provides an output sine wave resulting in a resolution of 0.0001 inch, 0.0005 inch or 0.001 inch depending upon the associated electronic logic employed. It will be understood, of course, that although the aforesaid Anorad encoder is preferred because of its dimensional and operational compatability with the table of this invention other linear encoders may be employed.

The carriage member is provided with a V-shaped notch 44 in each of the longitudinally extending outer edges 45 of its side walls 46. The carriage is thus positionable between the side walls of the base member such that the corresponding notches of the base and carriage can be brought into alignment. In such aligned position sets of cross-mounted roller elements 48 and 50 are interposed in the notches. The first set 48 of such roller elements comprises a plurality of rollers which are disposed so that the axes 52 thereof are substantially perpendicular to one pair 54 of opposed parallel faces of the respective adjacent notches of the carriage 36 and base side walls 20, 22. The second set 50 of such roller elements comprises a plurality of rollers which are disposed with their axes 56 substantially perpendicular to the other pair 58 of opposed parallel faces of the respective adjacent notches of the carriage and base side walls. The rollers of one set are interposed between the adjacent rollers of the other set. In this manner substantially equal distribution of the rolling force of the carriage upon the base member side walls is achieved by development of line contact with the notches.

Mounted on base member 14, such as by means of a centrally located pillow block 60 and a pair of end bearings 62, 64, is a lead or drive screw 66. The screw is formed with flights 68 which are adapted to cooperate with a nut element 70 carried by the carriage so as to effectuate an advance of the carriage by predetermined lineal distances per revolution of the lead screw. For example, one convenient design for the lead screw and nut affords a 0.1 inch lead (0.1 inch per revolution) and a maximum carriage translational speed of 5 inches per second. It will be appreciated, however, that the particular lead and translational speed for the carriage may be varied in accordance with the functional characteristics intended for the positioning table. A drive motor 72 is provided which is operatively connected to one end of the lead screw such as by means of a conventional coupling element 74. The motor is connected by means of a power cord 76 to a source of electrical supply (not shown).

Figure 4:
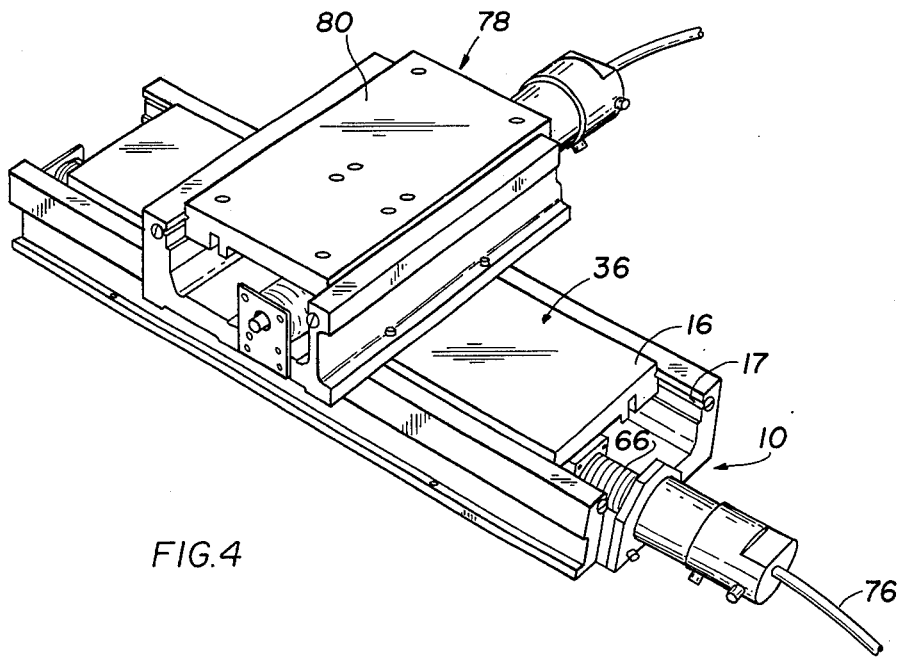
FIG. 4 is a perspective view of a pair of positioning tables constructed in accordance with the present invention with one mounted atop the other to afford movement of the workpiece along a pair of perpendicularly extending axes.

Except for the provision of the pre-tensioned side wall 20 and/or 22, and the formation of the V-notches integrally in the surfaces of the carriage and base member side walls, the positioning table described above is conventional in construction. Accordingly, the present specification will not be encumbered with details of construction beyond those disclosed herein. It will also be recognized that a plurality of such tables may be mounted atop one another such as depicted in FIG. 4 in order to afford multidirectional travel of the workpiece along any predetermined path. Thus, the additional table 78 shown may surmount carriage 36 such that its carriage 80 is reciprocable along an axis which is perpendicular to the direction of travel of carriage 36. A third table (not shown) may be positioned upon carriage 80 of table 78 with a disposition such that its carriage is reciprocable vertically. It will thus be seen that the workpiece atop the uppermost positioning table may be moved through any desired predetermined arcuate paths so as to enable the performing of various machining or like operations thereon.

As mentioned above, one feature of the invention dispenses with the need for separate inserts which were conventional heretofore and were utilized to provide the ways upon which the carriage of the table was reciprocably mounted. In accordance with this aspect of the invention the ways 82 comprise V-notches 32 and 44 formed integrally in the respective outer edges and side walls of the carriage and base member. The carriage and base member are made from a modular cast iron, desirably one with a full pearlitic matrix and an "E" modulus of approximately $23.5 \times 10^6$. The V-notches are heat-treated to develop a hardness greater than that of the adjacent surfaces of the respective carriage and base members. In its preferred embodiment the hardness of the notches is at least Rc 55. The heat treatment of the notches should desirably be sufficient to harden the working faces to a depth of approximately 0.090 inches. In providing such hardness for the notches care should be taken to avoid hardening of the adjacent surfaces of the carriage and base member side walls so as not to impair the machinability of such areas.

The V-notches are given a depth adequate to accomodate roller bearings of a predetermined diameter to insure proper mounting of the carriage and alignment thereof. A preferred roller comprises 52100 ball bearing steel hardened to Rc 60–63. However, the size of the rollers may vary as desired, the diameter being matched to the size of the V-notches. One advantage of the present invention is the cooperation between the flexure side wall 20 and the roller-containing V-notches and side wall 22. Due to the pre-load of side wall 20 the carriage is brought into proper alignment within the ways of the table even though there may be variances from the tolerances for the faces of the notches after final machining of such surfaces. Where necessary the size of the rollers may be changed to provide the required alignment in conjunction with the aligning force exerted by side wall 20.

The ends of the base member are desirably provided with limit stops 84 adjacent the outer extremities of the ways for the purpose of insuring an absolute limit to the travel of the carriage. However, as will be understood, photoelectric stops (not shown) are generally employed as the primary limit stops and serve to reverse drive motor 72 prior to contact with stops 84. As is known, intelligence is provided for the desired pattern of carriage travel and there appears no reason to burden the present specification with the details of construction of such known systems which generally include a computer.

It will be understood that various changes in the details, materials, arrangements of parts and operation conditions which have been herein described and illustrated in order to explain the nature of the invention may be made by those skilled in the art within the principles and scope of the invention.

Having thus set forth the nature of the invention, what is claimed is:

1. A workpiece positioning table comprising in combination:
   a generally channel-shaped base member having a bottom web element and a pair of laterally spaced side wall elements projecting upwardly therefrom, at least one of said side wall elements being pre-tensioned under the influence of a predetermined load so as to provide a spring force tending to flex said side wall element inwardly towards the other of said side wall elements;
   a V-shaped notch formed in the inner face of each of said side wall elements at a location above said bottom web element and in vertically aligned relation, said notches extending lengthwise of the respective side walls;
   an elongated carriage member carried by said side wall elements for reciprocatory movement therealong, a V-shaped notch formed in each of the longitudinally extending outer edges of said carriage extending lengthwise of said respective outer edges;
   sets of cross-mounted roller elements positioned within the adjacently aligned V-notches of said carriage and base members so as to rollably mount said carriage on the side walls of said base member;
   means for reciprocably moving said carriage member;
   and means for determining the extent of linear movement of said carriage member;
   whereby the pre-tensioning force of said at least one side wall element is sufficient to maintain said carriage member in aligned mounted relation on said side wall elements.

2. A positioning table according to claim 1, wherein said base and carriage members are formed of a nodular cast iron and each of said V-notches has been heat-treated to a hardness greater than the hardness of the adjacent surfaces of said carriage and base members.

3. A positioning table according to claim 2, wherein said V-notches have a hardness of at least Rc 55.

4. A positioning table according to claim 1, wherein first and second sets of cross-mounted roller elements are positioned within the adjacently aligned V-notches of said carriage and base members, said first set of roller elements comprising a plurality of rollers disposed such that the axes thereof are substantially perpendicular to one pair of opposed parallel faces of the respective V-notches of said carriage and base members, said second set of roller elements comprising a plurality of rollers disposed such that the axes thereof are substantially perpendicular to the other pair of opposed parallel faces of the respective V-notches of said carriage and base members, the rollers of said first set being interposed between the adjacent rollers of said second set.

5. A positioning table according to claim 1, wherein said means for reciprocably moving said carriage member includes a drive screw mounted on said base member, a nut element cooperable with said drive screw mounted on said carriage member, and motor means operatively connected to said drive screw for driving same.

6. A positioning table according to claim 1, wherein said means for determining the extent of linear movement of said carriage member includes an optical encoder scale carried by said carriage member for movement therewith and in depending relation thereto, an optical encoder being mounted fixedly and adapted to read said scale and provide a signal representative of the linear movement of said carriage member.

7. A positioning table according to claim 1, wherein said one side wall element is pre-loaded in an amount of approximately 100 pounds per 12 inch lineal section thereof.

8. A positioning table according to claim 1, wherein at least one additional base member and associated carriage member reciprocably carried thereon is mounted on the table for movement therewith, said additional carriage member being reciprocable in a direction substantially perpendicular to the direction of movement of the underlying carriage member.

* * * * *